June 18, 1957 ICHIRO HAKOGI 2,796,164
APPARATUS FOR PRINTING THE CIRCUMFERENTIAL SURFACE
OF HOLLOW CYLINDRICAL ARTICLES
Filed Nov. 18, 1953 3 Sheets-Sheet 1
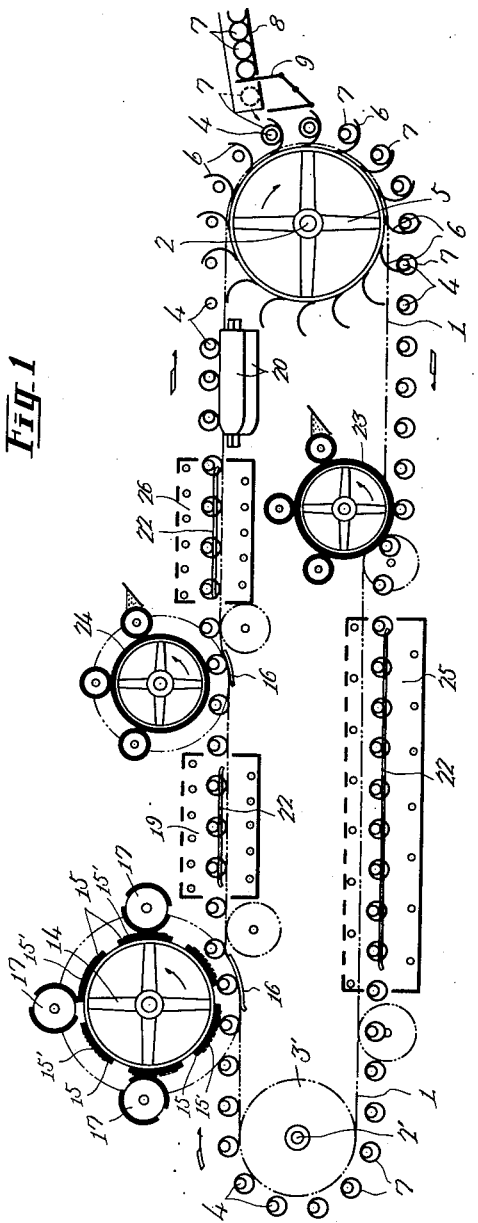
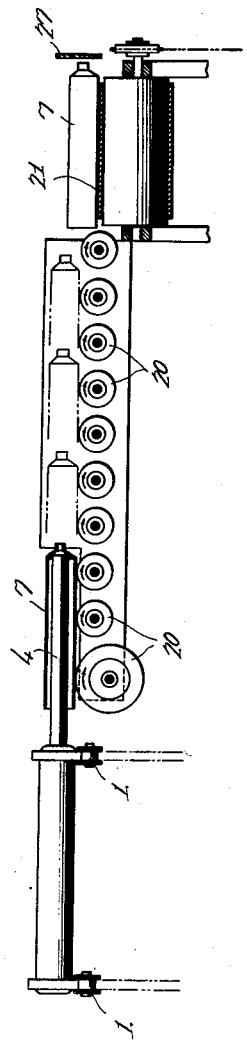
INVENTOR:
ICHIRO HAKOGI
BY:

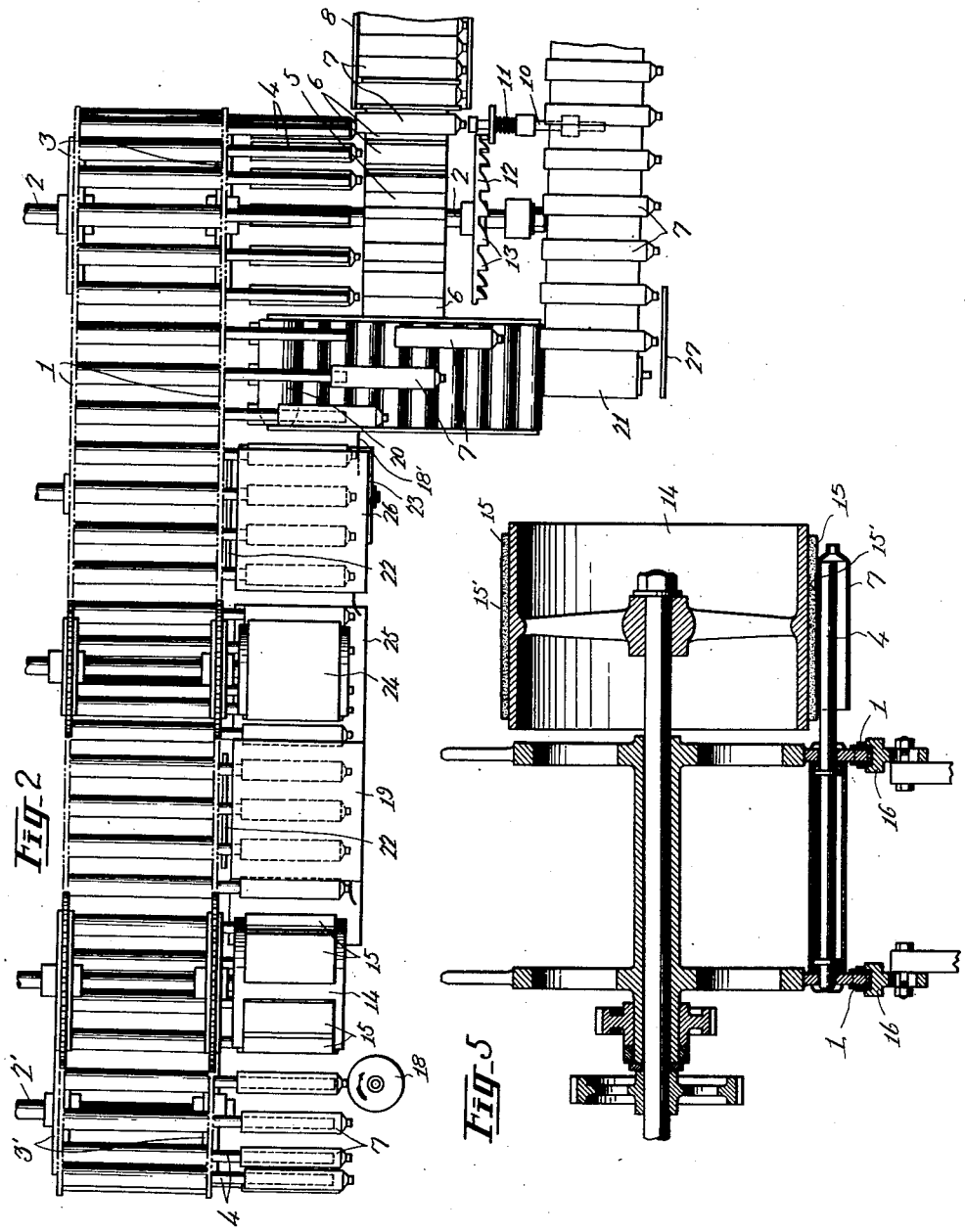

June 18, 1957      ICHIRO HAKOGI      2,796,164
APPARATUS FOR PRINTING THE CIRCUMFERENTIAL SURFACE
OF HOLLOW CYLINDRICAL ARTICLES
Filed Nov. 18, 1953      3 Sheets-Sheet 3
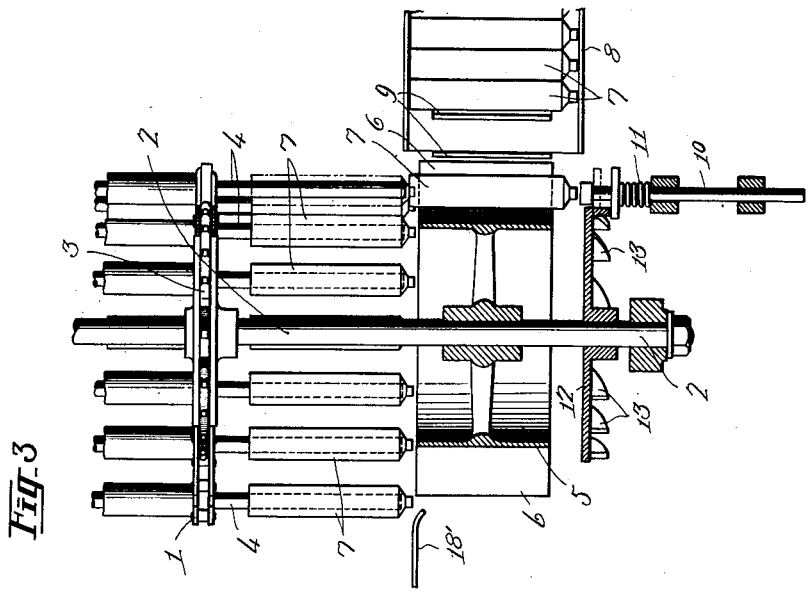
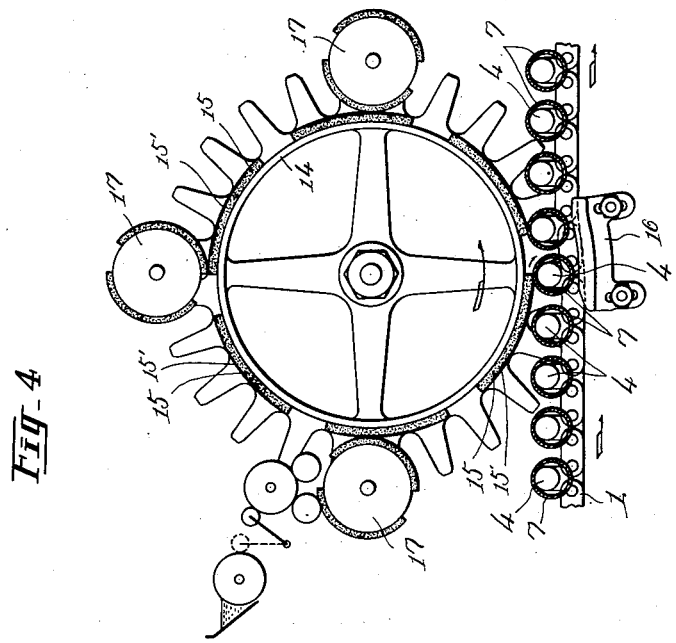
INVENTOR.
ICHIRO HAKOGI
BY:

2,796,164

APPARATUS FOR PRINTING THE CIRCUMFERENTIAL SURFACE OF HOLLOW CYLINDRICAL ARTICLES

Ichiro Hakogi, Setagaya-ku, Tokyo, Japan

Application November 18, 1953, Serial No. 392,821

2 Claims. (Cl. 198—24)

This invention relates to an apparatus for printing the circumferential surface of hollow cylindrical articles, particularly such as a tube or the like, which are supple to external pressure. More particularly, it relates to an apparatus for printing the circumferential surface of hollow cylindrical articles characterized in that the following devices are operated consistently in a continuous manner and their respective operations are carried out automatically, a feeding device wherein there is provided a plurality of mandrels having a smaller diameter than that of the cylindrical articles to be printed and freely rotatable and set at suitable intervals on one side of an endless chain conveyor which rotates in one direction and the said hollow cylindrical articles to be printed which are being carried in automatically at the beginning end of the said endless chain conveyor are automatically and successively inserted onto and suspended on the said mandrels at a determined position and are conveyed in one direction, a printing device for applying a transfer onto the circumferential surface of the hollow articles wherein the said hollow articles moving suspended on the mandrels are brought successively into contact with a revolving blanket cylinder having the blanket sheets around its circumferential surface and are made to revolve against the circular arc of the blanket cylinder while simultaneously making one rotation themselves, a device for drying the printed surface of the said hollow articles wherein the printed hollow articles are conveyed, as they are, suspended on the mandrels, through the drying chamber, and further a delivering device which removes the said hollow articles from the mandrels by means of bringing them into contact with rollers rotating in the direction along the axis line of the mandrels and which conveys the hollow articles to a desired place.

In the drawings: Fig. 1 shows the system of continuous operation of this invention and Fig. 2 is a plan view thereof, Fig. 3 is an enlarged sectional plan view of the device for feeding the article to be printed, Fig. 4 is an enlarged front view of the transfer printing device and Fig. 5 a sectional side view thereof, and Fig. 6 is a sectional side view of the delivering device.

Now, referring to the drawings, 1 is an endless chain conveyor which is laid on sprockets 3, 3′ of shafts 2, 2′ and which is made to revolve in the direction of the arrows. From one side thereof are provided laterally a plurality of rotatable mandrels 4 at suitable intervals. A drum 5 having receiving members 6 around its circumferential surface is fixed on the shaft 2 and rotates synchronously with the sprockets 3, that is, the mandrels 4. The distance between each receiving member 6 is set exactly the same as that of the mandrels 4. As will be described later, when a hollow cylindrical article 7 to be printed, such as a tube, is fed into the receiving member 6, its axis line is made to be consistent with that of the mandrel 4. The hollow cylindrical articles 7 to be printed are placed on a grade 8 and by the appearance and disappearance of a barrier 9 they drop in order one by one automatically into the receiving members 6.

The receiving member 6 receiving the hollow article 7 revolves and when it comes to a determined position, the said hollow article 7 is thrusted and inserted onto the mandrel 4 by means of a thrusting device mounted at the side. Namely, a protruder 10 is mounted at a determined position within the locus of the receiving member 6 and is disposed to thrust constantly by means of a spring 11, a disc 12 having actuating saw-shaped teeth 13 around the edge of its circumference is mounted on the axis 2 and rotates synchronously with the drum 5, the protruder 10 resisting against the spring 11 is moved back by the top surface of the said actuating tooth 13, and when the receiving member 6 accommodating the hollow article 7 becomes consistent with the protruder 10, the said protruder 10 is thrusted by the action of the actuating tooth 13 disconnecting from the protruder 10 by the disc 12 rotating and it hits the end face of the hollow article 7, thereby fitting the same onto the mandrel 4. After the receiving member 6 advances, the protruder 10 by means of the inclined plane of the actuating tooth 13 is again moved back resisting against the spring 11 and is set for the next action. In this manner the moving hollow articles 7 accommodated successively in the bearing troughs 6 are fitted in order onto the mandrels 4 which are set at the same line of level, and the said hollow articles 7 suspended on the mandrels 4 move in one direction in accordance with the revolution of the endless chain conveyor 1.

A blanket cylinder 14 having blanket sheets 15 on which a pattern is printed around its circumferential surface is so provided as to rotate at a speed faster than the movement of the hollow articles 7. The said hollow articles 7 suspended on the mandrels 4 are brought into contact with this blanket cylinder and the printed pattern on the blanket is transferred onto their circumferential surface. Namely, the hollow article 7 suspended on the mandrel 4 rotates as soon as it comes in contact with the blanket sheet 15 by the interposing pressure with the mandrel and simultaneously revolves against the circular arc of the blanket cylinder 14 along the blanket sheet 15, at which time the said hollow article 7 is made to make one rotation. Further, in order to maintain the level position of the hollow articles 7, the endless chain conveyor 1 during this printing operation is securely held by the track 16 so as not to shift, and the said track 16 can be adjusted at will by moving up or down according to the thickness of the articles being printed. Furthermore, considering that the hollow article 7 while moving may shift at random on the mandrel, its one side is repressed and its position is corrected by a roll-shaped adjuster 18, which fits it perfectly to a set position on the said mandrel 4 and adjusts its position with the printing surface prior to a ground coating and the printing operation. The hollow article thus printed is passed, as it is, suspended on the mandrel, through a drying chamber 19 in which is arranged, for example, infra-red ray lamps. While passing through this chamber, the hollow article 7 suspended on the mandrel 4 is rotated by the rotation of the said mandrel 4 that is, the mandrel 4 is brought into contact with the rail 22, and the hollow article is moved on while revolving in the said drying chamber 19 so as to dry its circumferential surface uniformly. An elongated guide plate 18′ may be provided in the region of each drying chamber so that accidental sliding movement of the hollow articles relative to the mandrels is prevented. Next, the hollow article which has been dried is delivered from the mandrel 4 by means of being brought into contact with the upper surface of rollers 20 which are revolving rapidly in a direction at right angle to that in which the hollow article is moving, namely, in the direction of the axis line of the mandrel 4. One end of the said rollers is tapered or rounded, as shown in Fig. 1, so that the diameter gradually gets smaller. Consequently the hollow article, as it moves along, is lifted a little by the rollers when its bottom surface comes into contact therewith. The hollow article easily separates from the mandrel 4 and is moved sidelong in accordance with the rotation of the rollers 20. The hollow articles having been delivered from the mandrels 4 by the rollers 20 are conveyed to a desired place by means of a belt 21. 27 is a stopper which prevents the hollow articles from dropping from the belt 21.

Further, as occasion demands, prior to the printing operation a ground coating is applied around the circumferential surface of the hollow article 7 by means of bringing the same, in its suspended state, into contact with the ground coating drum 23. Also, when it is necessary to prevent the printed parts from coming off by means of applying a final coating on its printed surface, the hollow article after having been printed is, in the same manner described above, brought into contact with a drum 24 coated with varnish and is applied this varnish. These devices are practically the same as the afore-mentioned printing device, but in the ground coating it is preferable that the ground coating drum 23 makes a negative revolution to the direction the hollow article moves in order that the said hollow article 7 coming in contact with the ground coating drum 23 can rotate several times. Furthermore, the hollow article is passed through drying chambers 19, 25, 26 so as to be dried after the respective process.

As described above, according to this invention, a very good apparatus has been obtained for printing the circumferential surface of hollow cylindrical articles, such as tooth-paste tube, which are supple to pressure, and it has a high efficiency for this type of printing in view of the fact that the feeding, conveying, printing and delivering of the articles being printed can be carried out automatically and consistently in a continuous manner.

I claim:

1. In a removal arrangement, in combination, conveyor chain means for moving tubular work pieces along a predetermined path, said conveyor chain means having a chain body and a plurality of elongated supporting members each extending in a direction transverse to said predetermined path and having a free end spaced from said chain body and being adapted to engage a portion of the interior of a tubular work piece so as to support the same; and removal means for removing tubular work pieces supported by said supporting members, said removal means including a roller member in the region of said supporting members mounted for rotational movement about an axis of rotation extending substantially in the direction of said predetermined path, said roller member having a tapered end portion and a body portion adapted frictionally to engage the work pieces supported by said supporting members as the work pieces are moved past said roller member, and driving means for rotating said roller member about said axis in a direction so that the work pieces frictionally engaged by said roller member are moved past the respective free end portions of said supporting members of said conveyor chain means away from said chain body thereof whereby tubular work pieces having inner and outer diameters within predetermined ranges may be removed from said conveyor chain means.

2. In a combined feed and removal arrangement, in combination, conveyor chain means for moving tubular work pieces along a predetermined path at a substantially constant rate, said conveyor chain means having a chain body and a plurality of elongated supporting members each extending in a direction transverse to said predetermined path and having a free end portion spaced from chain body and being adapted to engage a portion of the interior of a tubular work piece so as to support the same, said conveyor chain means being mounted for movement past feed and removal zones; feed means in said feed zone for supplying tubular work pieces to said conveyor chain means, said feed means including combined retaining and conveying means for temporarily retaining and conveying tubular work pieces in said feed zone along a feed path substantially parallel to said predetermined path at a rate equal to said substantially constant rate, and moving means for moving the tubular work pieces temporarily retained by said combined retaining and conveying means from said combined retaining and conveyong means to said conveyor chain means while the tubular work pieces are being moved along said feed path and while said conveyor chain means moves past said feed zone whereby tubular work pieces may be supplied to said conveyor chain means while the same is moving along said predetermined path at said substantially constant rate; and removal means in said removal zone for removing tubular work pieces supported by said supporting members, said removal means including a roller member in said removal zone and in the region of said supporting members, said roller member being mounted for rotational movement about an axis of rotation extending substantially in the direction of said predetermined path, said roller member being adapted frictionally to engage the tubular work pieces supported by said supporting members as the tubular work pieces are moved past said roller member, and driving means for rotating said roller member about said axis in a direction so that the tubular work pieces frictionally engaged by said roller member are moved past the the respective free end portions of said supporting members of said conveyor chain means and away from said chain body thereof whereby the tubular work pieces are removed from said conveyor chain means.

References Cited in the file of this patent

UNITED STATES PATENTS

| | | |
|---|---|---|
| 1,910,712 | Prussing | May 23, 1933 |
| 1,935,783 | Roemer | Nov. 21, 1933 |
| 1,947,171 | Prussing | Feb. 13, 1934 |
| 1,992,634 | Prussing | Feb. 26, 1935 |
| 2,108,443 | Prussing | Feb. 15, 1938 |
| 2,309,696 | Friden | Feb. 2, 1943 |
| 2,326,850 | Gladfelter et al. | Aug. 17, 1943 |
| 2,362,663 | Redin et al. | Nov. 14, 1944 |
| 2,402,144 | Baker | June 18, 1946 |
| 2,408,019 | Goebel et al. | Sept. 24, 1946 |
| 2,472,293 | Groven | June 7, 1949 |